United States Patent
Greenberg et al.

(10) Patent No.: US 7,577,099 B1
(45) Date of Patent: Aug. 18, 2009

(54) METHOD AND APPARATUS FOR FAULT LOCALIZATION IN A NETWORK

(75) Inventors: Albert G. Greenberg, Summit, NJ (US); Ramana Rao Kompella, La Jolla, CA (US); Alex C. Snoeren, Fullerton, CA (US); Jennifer Yates, Morristown, NJ (US)

(73) Assignee: AT&T Corp., New York, NY (US)

( * ) Notice: Subject to any disclaimer, the term of this patent is extended or adjusted under 35 U.S.C. 154(b) by 377 days.

(21) Appl. No.: 11/399,643

(22) Filed: Apr. 6, 2006

(51) Int. Cl.
- G01R 31/08 (2006.01)
- G06F 11/00 (2006.01)
- G08C 15/00 (2006.01)
- H04J 1/16 (2006.01)
- H04J 3/14 (2006.01)
- H04L 1/00 (2006.01)
- H04L 12/16 (2006.01)

(52) U.S. Cl. .................. 370/242; 370/241
(58) Field of Classification Search .......... 370/242, 370/241; 709/224, 223
See application file for complete search history.

(56) References Cited

U.S. PATENT DOCUMENTS

2002/0019870 A1* 2/2002 Chirashnya et al. ......... 709/224

FOREIGN PATENT DOCUMENTS

WO   WO 2006005665 A2 *  1/2006

* cited by examiner

*Primary Examiner*—Ricky Ngo
*Assistant Examiner*—David Oveissi

(57) ABSTRACT

A method and apparatus for automatically localizing failures in a network. Failures can be localized by receiving an observation, querying a database for a plurality of models of risks and calculating a hypothesis from the plurality of models of risks that explains the observation. The observation comprises link failures reported by a plurality of data sources. The plurality of models or risks represents links that would likely be impacted by the failure of each component within the network stored in a Shared Risk Link Group (SRLG) database. A Spatial Correlation Engine (SCORE) applies an algorithm to calculate a hypothesis from the plurality of models of risks that explains the observation, thereby, automatically localizing failures in a network.

3 Claims, 5 Drawing Sheets

100

400

500

500

METHOD AND APPARATUS FOR FAULT LOCALIZATION IN A NETWORK

BACKGROUND OF THE INVENTION

1. Field of the Invention

The present invention relates generally to communication networks and, more particularly, to a method and apparatus for fault localization in a network, e.g. internet protocol (IP) and optical networks.

2. Description of the Related Art

Today's networks are large, geographically distributed and constantly evolving. Such networks suffer from a wide and volatile set of failure modes. Conventionally, network fault management is performed manually by correlating a large number of failure notifications and alarms to determine which network elements have failed. While there are automated mechanisms for locating faults with a layer (e.g., SONET), such mechanisms may fail to report faults giving rise to "silent faults," or there may not be information available from these mechanisms for diagnosing reported faults. When an underlying failure in a network proves difficult to detect and localize, the duration of degraded network operation is prolonged before repair can commence. Moreover, localizing failure modes can be even more difficult at an optical layer, where event data is unavailable. Automatically localizing failures in a network, at any layer, would reduce downtime and increase overall efficiency of the network. Therefore, a need exists for a method and apparatus for automatically localizing failures in a network.

SUMMARY OF THE INVENTION

In one embodiment, the present invention enables a tool for automatically localizing failures in a network. For example, failures can be localized by receiving an observation, querying a database for a plurality of models of risks and calculating a hypothesis from the plurality of models of risks that explains the observation. The observation comprises link failures reported by a plurality of data sources. The plurality of models of risks represents links that would likely be impacted by the failure of each component within the network stored in a Shared Risk Link Group (SRLG) database. A Spatial Correlation Engine (SCORE) applies an algorithm to calculate a hypothesis from the plurality of models of risks that explains the observation, thereby, automatically localizing failures in a network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
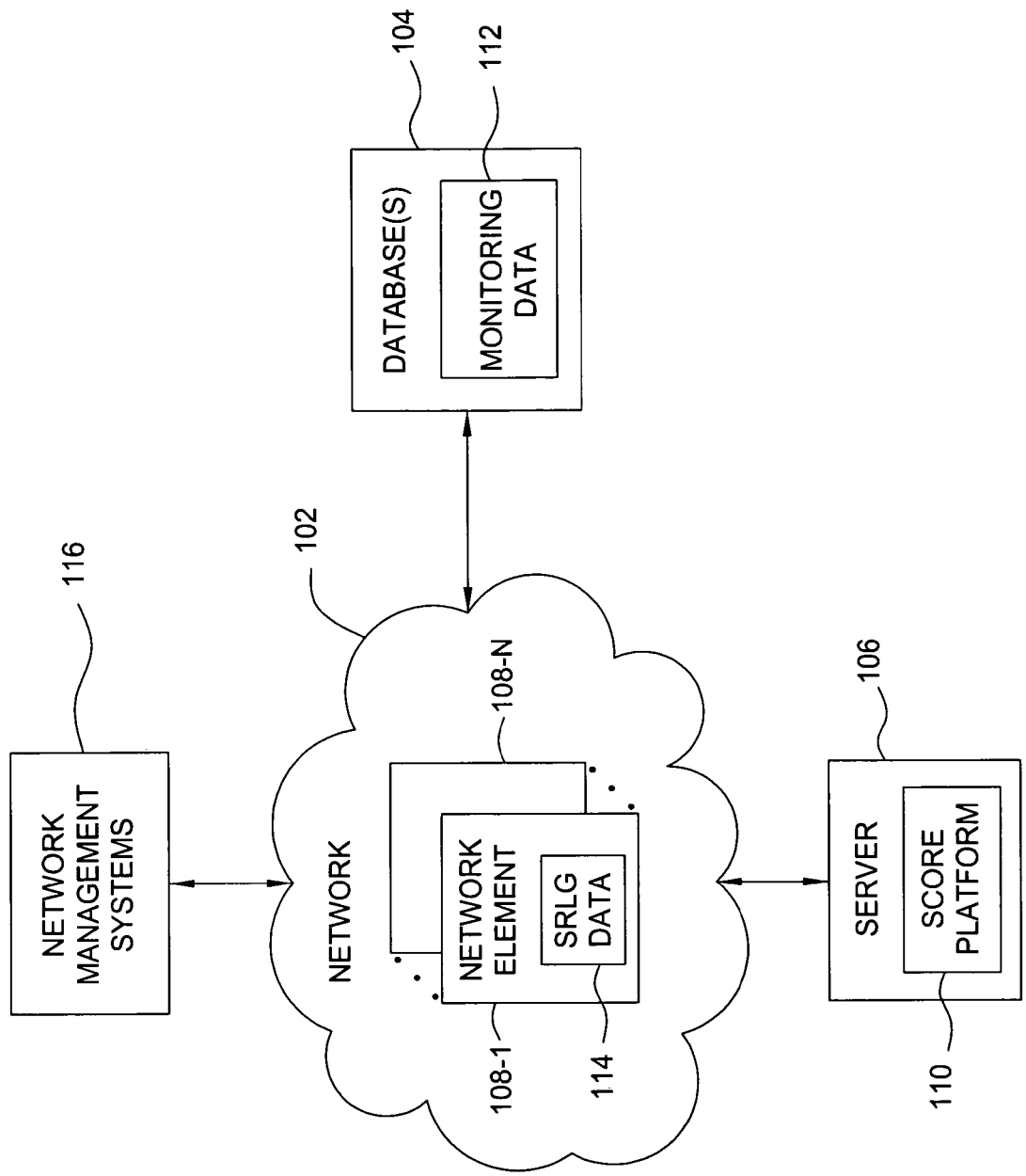
FIG. 1 is a block diagram depicting an exemplary network architecture in accordance with one or more aspects of the invention.

FIG. 1 is a block diagram depicting an exemplary network architecture 100 in accordance with one or more aspects of the invention. The network architecture 100 includes a network 102, one or more databases 104, and a server 106. The network 102 includes network elements 108-1 through 108-N (collectively referred to as network elements 108). The network 102 includes a packet network portion and a core transport network portion. The core transport network portion is typically an optical network. The network elements 108 comprise various types of network devices employed in packet networks and optical transport networks, such as routers, optical amplifiers, wavelength division multiplexing (WDM) systems, switches, cross-connects, and like type network devices known in the art. Network layer links (e.g., Internet Protocol (IP) links) are used to communicate data packets among the network elements 108.

Figure 2:
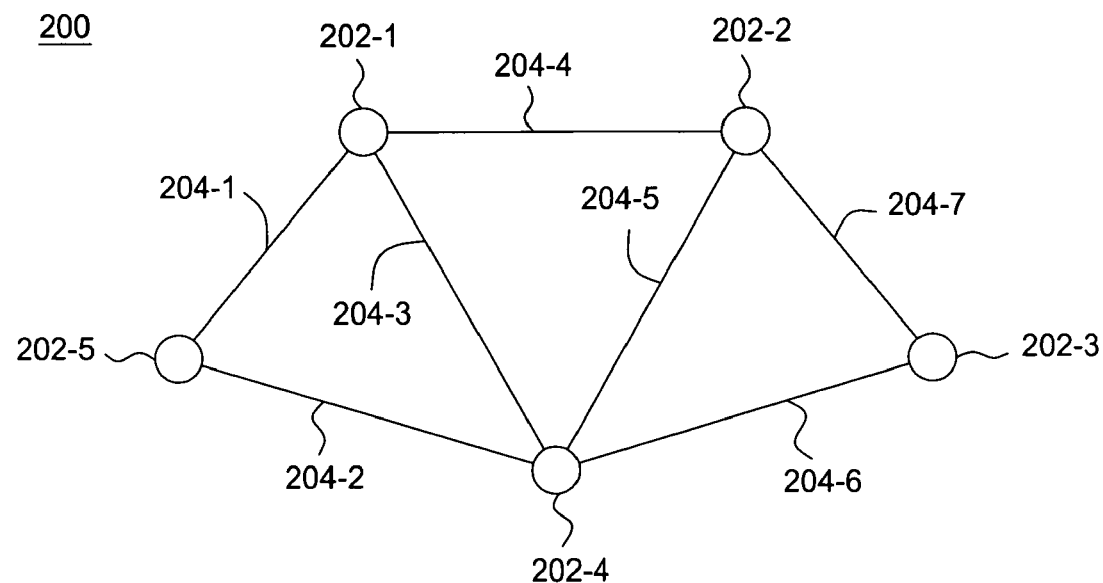
FIG. 2 is a block diagram depicting an exemplary network topology in accordance with one or more aspects of the invention.
Figure 2:
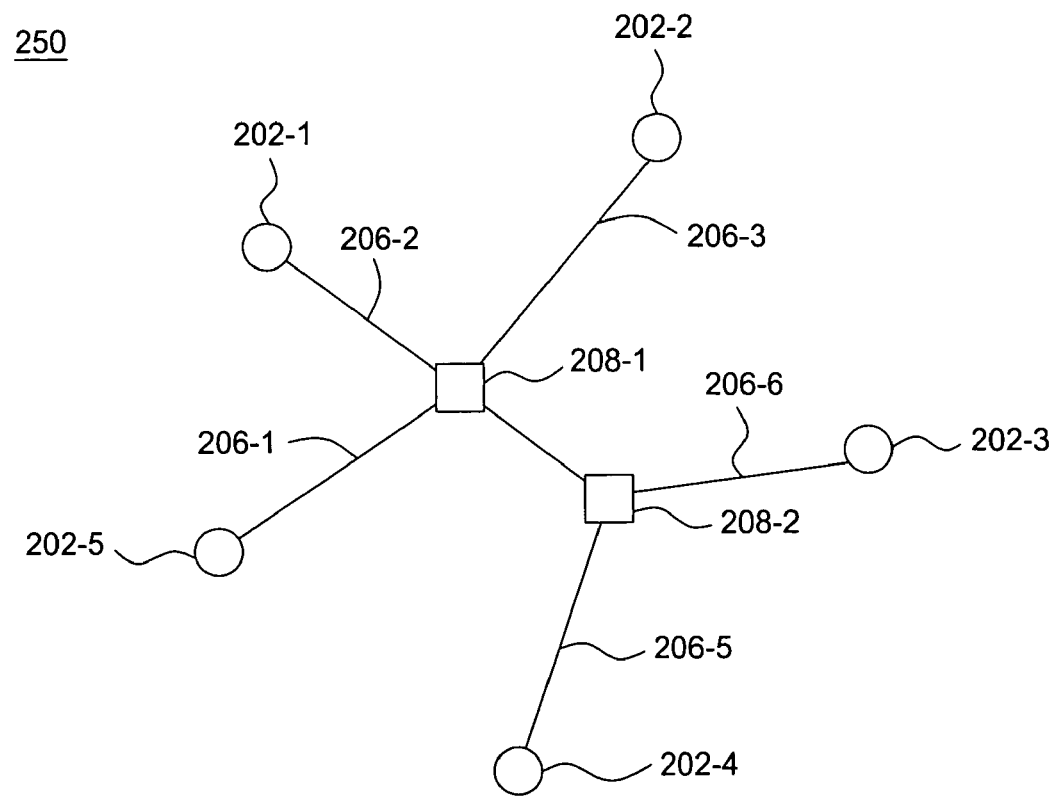

FIG. 2 is a block diagram depicting an exemplary network topology in accordance with one or more aspects of the invention. A logical view 200 of the network topology includes nodes 202-1 through 202-5 (collectively referred to as nodes 202) interconnected by links 204-1 through 204-7 (collectively referred to as links 204). Each of the nodes 202 represents one or more network elements. Each of the links 204 represents a logical circuit over which IP links may be established. In a physical view 250 of the network topology, the links 204 are implemented using physical circuits. The physical circuits may comprise a series of one or more optical fibers, optical amplifiers, SONET rings, intelligent optical mesh and/or WDM systems, and the like. Multiple optical fibers are carried in a single conduit, referred to as a fiber span. In the present example, the links 204 are implemented using fiber spans 206-1 through 206-6 (collectively referred to as fiber spans 206) and dense WDMs (DWDMs) 208-1 and 208-2 (collectively DWDMs 208).

Several IP links may be established over each of the fiber spans 206 and through each of the DWDMs 208. The failure of any one of these components would result in the failure of all IP links traversing the component. Each of these components represents a shared risk among all the IP links that traverse therethrough. The associations between IP links and components are referred to as shared risk link groups (SRLGs). In the present example, links 204-3 and 204-5 are both routed over the fiber span 206-4 and thus would both fail with the failure of the fiber span 206-4. Similarly, DWDM 208-1 is shared between links 204-1, 204-3, 204-4, and 204-5, which the links 204-6 and 204-7 share DWDM 208-2. The topology shown in FIG. 2 is merely exemplary. Those skilled in the art will appreciate that the network may include many more nodes and links forming a substantially more complex topology.

Returning to FIG. 1, each of the network elements 108 includes data indicative of SRLGs in the network 102 ("SRLG data 114"). The SRLG data 114 collectively provides a shared risk group model that is divided into hardware related risks and software related risks. Hardware related SRLGs include:

1) Fiber: At the lowest level, a single optical fiber carries multiple wavelengths using DWDM. One or more IP links are carried on a given wavelength. All wavelengths that propagate through a fiber form an SRLG with the fiber being the risk element. A single fiber cut can simultaneously induce faults on all of the IP links that ride over that fiber.

2) Fiber Span: In practice, a set of fibers are carried together through a cable. A set of cables are laid out in a conduit. A cut (from, e.g., a backhoe) can simultaneously fail all links carried through the conduit. These set of circuits that ride through the conduit form the fiber span SRLG.

3) SONET Network Elements: The SONET network elements can be collectively grouped together: these consist of optical amplifiers, add-drop multiplexers (used to construct optical rings), and WDM Optical Electronic-Optical converters and other similar components.

4) Router Modules: A router is usually composed of a set of modules, each of which can terminate one or more IP links. A module-related SRLG denotes all of the IP links terminating on the given module, as these would all be subject to failure should the module become non-functional.

5) Router: A router typically terminates a significant number of IP links, all of which would likely be impacted by a router failure (either software or hardware). Hence, all of the IP links terminating on a given router collectively belong to a given router SRLG.

6) Links: An individual link can also fail due to the failure of a single port on the router (impacting only the one link), or through other failure modes that impact only the single link.

Software related SRLGs include:

1) Autonomous System: An autonomous system (AS) is a logical grouping of routers within the Internet or a single enterprise or provider network (typically managed by a common team and systems). These routers are typically all running a common instance of an intra-domain routing protocol and, although extremely rare, a single intra-domain routing protocol software implementation can cause an entire AS to fail. Exemplary intra-domain routing protocols include interior gateway protocols (IGPs), such as open shortest path first (OSPF) protocol.

2) OSPF Areas: Although an OSPF area is a logical grouping of a set of links for intra-domain routing purposes, there can be instances where a faulty routing protocol implementation can cause disruptions across the entire area. Hence, the IP links in a particular area form an OSPF Area SRLG.

At least a portion of the network elements 108 are configured to generate fault notifications, performance reports, and like type monitoring data. The monitoring data generated by the network elements 108 may be collected by network management systems 116 for storage in the database 104, or may be stored directly in the database(s) 104. The database(s) 104 may comprise one or more servers implementing any know database platform, such as a database platform commercially available from Oracle Corporation. The database(s) 104 store monitoring data 112 for the network elements 108. The server 106 is configured to implement a spatial correlation engine (SCORE) platform 110. As described below, the SCORE platform 110 utilizes the monitoring data 112 and the SLRG data 114 to perform fault localization in the network 102.

Figure 3:
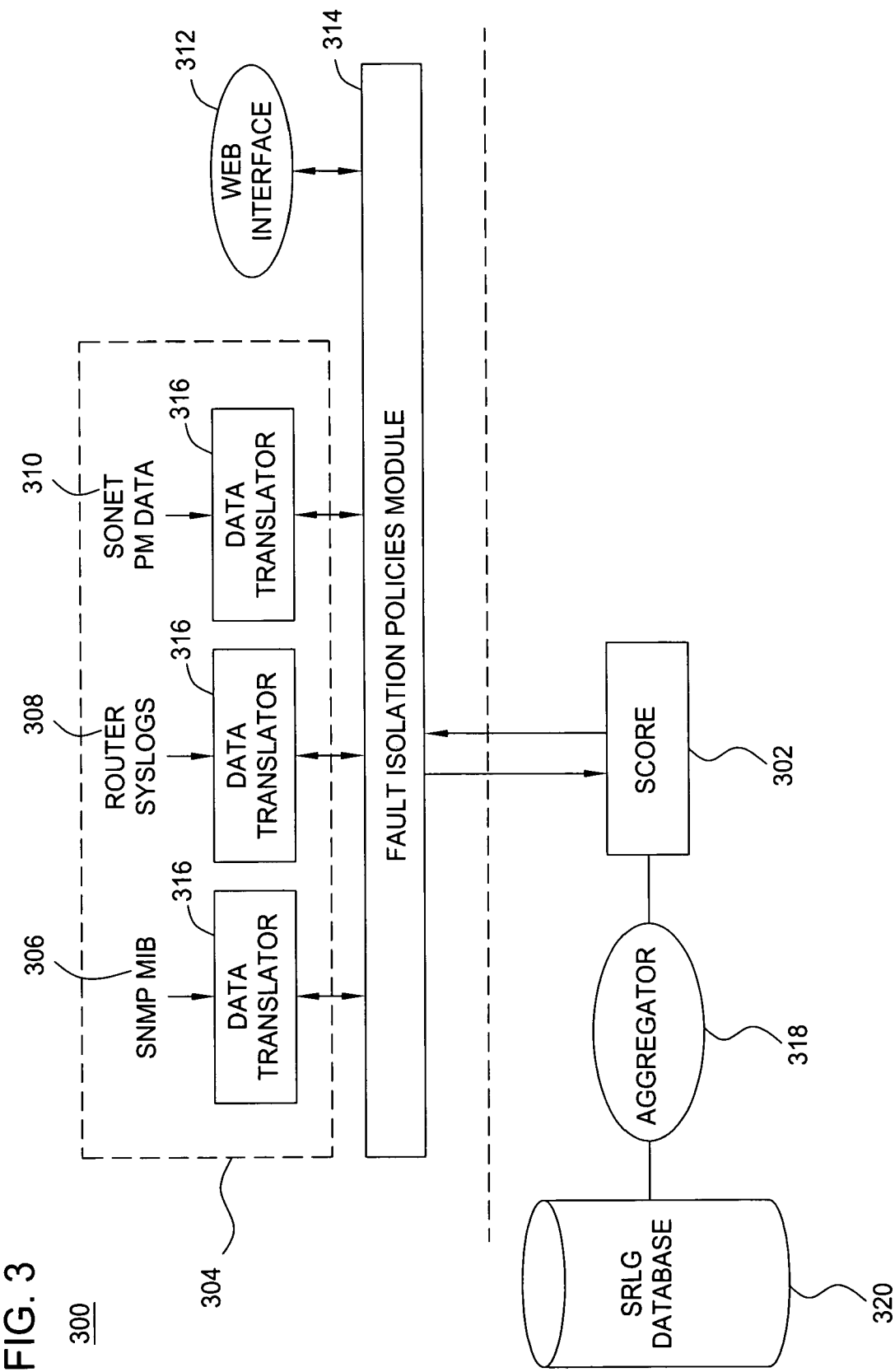
FIG. 3 is a block diagram depicting an exemplary embodiment of a spatial correlation engine (SCORE) platform in accordance with one or more aspects of the invention.

FIG. 3 is a block diagram depicting an exemplary embodiment of the SCORE platform 110 in accordance with one or more aspects of the invention. The SCORE platform 110 includes an SRLG database 320, an aggregator 318, a SCORE Engine 302, a Fault Isolation Policies (FIP) module 314, a web interface 312, and data translation module 304.

The data translation module 304 is configured to receive monitoring information generated by a variety of different network elements such as, for example Synchronous Optical Networking (SONET) equipment, Dense Wavelength Division Multiplexing (DWDM) equipment, routers, and the like. As described above, the monitoring data is typically collected from the network elements and stored in a centralized database. For example, the data translation module 204 may receive SNMP traps and performance measurements 306, router syslogs 308 and SONET performance metrics data 310. The different monitoring data are typically stored in different formats. The data translation module 204 includes data translators 316 configured to translate the monitoring information, for example SNMP information collected as an interface number or SONET performance monitoring data based on Circuit IDs, into link circuit IDs for analysis.

The FIP module 314 forms the bridge between the data translation module 304 and SCORE Engine 302. FIP module 314 records observations. Observations are a set of link failures that are potentially correlated, either temporally or otherwise. FIP module 314 clusters events in the received monitoring information that represent temporally correlated or spatially correlated events. In one embodiment, clustering is achieved by temporal correlation using a clustering algorithm based on gaps between failure events. The largest chain of events that are spaced apart within a set threshold are clustered as correlated events. Note, that the clustering algorithm is not simply based on fixed time bins. In another embodiment, clustering is achieved by identifying temporally correlated events with similar failure signatures (e.g., similar error rates). This second approach provides additional information for localizing faults when there are multiple, simultaneous independent events. These clustered events are recorded as observations by FIP module 314 and fed to SCORE Engine 302.

SRLG database 320 stores a plurality of models of risks (also referred to herein as shared risk groups) representing links that would likely be impacted by the failure of each component within the network. The plurality of models of risks are utilized by SCORE Engine 302 to calculate a hypothesis that explains an observation received from FIP module 314. The models of risks include hardware related risks and software related risks, as described above. The SRLG database 320 obtains the SRLG data from the network elements or from databases storing such data. However, due to the tremendous complexity of the hardware and software upon which a network is built, constructing a model that accounts for every possible failure mode is impractical. Rather, key components of the risk model that represent the prevalent network failure modes are identified.

SRLG database 320 may also contain errors if data is missing or is incorrect (e.g., has the incorrect routing for an optical circuit). SRLG database 320 errors occur, for example, when links are missing or incorrect information is stored for optical layer routing information regarding circuits. However, FIP module 314, working in conjunction with SCORE Engine 302, can help identify SRLG database 320 errors, as discussed below. Thus, the SLRG database 320 is flexible and dynamic enough to continually evolve.

SCORE Engine 302 performs the analysis for automatically localizing failures in a network. SCORE Engine 302 periodically loads the plurality of models of risks stored in SRLG database 320. Before the plurality of models of risks is captured by SCORE Engine 302, aggregator 318 collapses all aliases. Aliases are multiple risk groups that have the same membership, i.e. the same set of circuits may fail for two or more different reasons. Aliases are collapsed because it is impossible to distinguish between the causes.

When SCORE Engine 302 is initiated to perform a diagnosis, SCORE Engine 302 receives an observation from FIP module 314. SCORE Engine 302 analyzes the plurality of models of risks queried from SLRG database 320, and the received observation, to calculate a hypothesis that explains the observation. The calculated hypothesis determines where the failure is located, thus automatically localizing failures in a network.

The analysis performed by SCORE Engine 302 applies a greedy approximation to calculate the hypothesis. Note that in one embodiment using the method described below, that link failures are localized in both IP and optical networks, even by using only event data at an IP layer. The problem can be defined as follows. Given a set of links, C={c1, c2, . . . , cn} and shared risk groups G={G1, G2, . . . , Gm}. Each shared risk group Gi G contains a set of links Gi={ci1, ci2, . . . , cik} C that are likely to fail simultaneously. Although the terms "links" and "circuits" are used, it will be apparent to one skilled in the art that the formulation simply deals with sets and can be applied to arbitrary problem domains. Given an input observation comprising of events on a subset of circuits, O=ce1, ce2, . . . , cem, the problem is to identify the best hypothesis, H={Gh1, Gh2, . . . , Ghk} G such that H explains O.

The analysis performed by SCORE Engine 302 applies a greedy approximation to calculate the hypothesis. Note that in one embodiment using the method described below, that link failures are localized in both IP and optical networks, even by using only event data at an IP layer. The problem can be defined as follows. Given a set of links, $C=\{c_1, c_2, \ldots, c_n\}$ and shared risk groups $G=\{G_1, G_2, \ldots, G_m\}$. Each shared risk group $G_i \epsilon G$ contains a set of links $G_i=\{c_{i1}, c_{i2}, \ldots, c_{ik}\} \subset C$ that are likely to fail simultaneously. Although the terms "links" and "circuits" are used, it will be apparent to one skilled in the art that the formulation simply deals with sets and can be applied to arbitrary problem domains. Given an input observation comprising of events on a subset of circuits, $O=c_{e1}, c_{e2}, \ldots, c_{em}$, the problem is to identify the best hypothesis, $H=\{G_{h1}, G_{h2}, \ldots, G_{hk}\} \subset G$ such that H explains O.

The SCORE Engine 302 applies a greedy approximation algorithm to the problem set described above. The greedy approximation utilizes two metrics; a hit ratio and a coverage ratio. Given $|G_i|$ is the total number of links that belong to the shared risk group $G_i$ (known as the cardinality of $G_i$) and $|G_i \cap O|$ is the number of elements of $G_i$ that also belong to O, the hit ratio and coverage ratio are defined as follows. The hit ratio of a shared risk group $G^i$ is the fraction of circuits in the group that are part of the observation represented defined as $|G_i \cap O|/|G_i|$. The coverage ratio of a shared risk group $G_i$ is the portion of the observation explained by a given shared risk group defined as $|G_i \cap O|/|O|$.

The greedy algorithm solves the problem set by iteratively selecting a shared risk group that explains the greatest number of faults in the observation with the least error within the error threshold provided by Fault Localization Policies 314. In other words, the goal is to obtain the highest coverage ratio and hit ratio. In every iteration, the algorithm computes the hit ratio and coverage ratio for all the shared risk groups that contain at least one element of the observation. It selects the shared risk group with the maximum coverage and prunes both the group and its member circuits from the graph. In the next iteration, the algorithm re-computes the hit and coverage ratio for the remaining set of shared risk groups and circuits. This process repeats, adding the shared risk group with the maximum coverage in each iteration to the hypothesis, until finally terminating when there are no circuits remaining in the observation.

The greedy algorithm maintains two separate lists: explained and unexplained. When a shared risk group is selected for inclusion in the hypothesis, all circuits in the observation that are explained by this shared risk group are removed from the un-explained list and placed in the explained list. The hit ratio is computed based on the union of the explained and un-explained list, but coverage ratio is computed based only on the unexplained list. The reason for this is straightforward: multiple failures of the same circuit will result in only one failure observation. Hence, the hit ratio of a shared risk group should not be reduced simply because some other shared risk group also accounts for the failure observation.

When SCORE Engine 302 calculates a hypothesis completing the diagnosis, the information may be displayed via web interface 312. Web interface 312 consists of a table consisting of various columns that are updated each and every instance a new set of events is generated for real-time diagnosis. One column outputs the actual event start time and the end time using one of the clustering algorithms described above. Another column represents the set of links that were impacted during the event. Finally, another column (in either one or two separate columns) gives descriptions of the groups of components that form the diagnosis report for that observation. The diagnosis report also consists of the hit ratio, coverage ratio and the final error threshold used for the shared risk groups involved in calculating the hypothesis. In addition, web interface 312 displays for view archived logs including raw events and their associated diagnosis results.

Moreover, FIP module 314, in conjunction with SCORE Engine 302, can identify data inconsistencies or SRLG database 320 issues. FIP module 314 queries SCORE Engine 302 with multiple error thresholds and calculates many different hypotheses. The hypotheses calculated using different error thresholds are compared to determine the data inconsistencies in SRLG database 320 or other SRLG database 320 issues. For example, being unable to calculate a single hypothesis to explain an observation, even after lowering the error threshold used in SCORE Engine 302, would indicate a SLRG database 320 error. Automatically identifying SRLG errors is critical to developing solid capacity planning procedures and planned maintenance procedures (which is based on the SRLG hierarchy).

Figure 4:
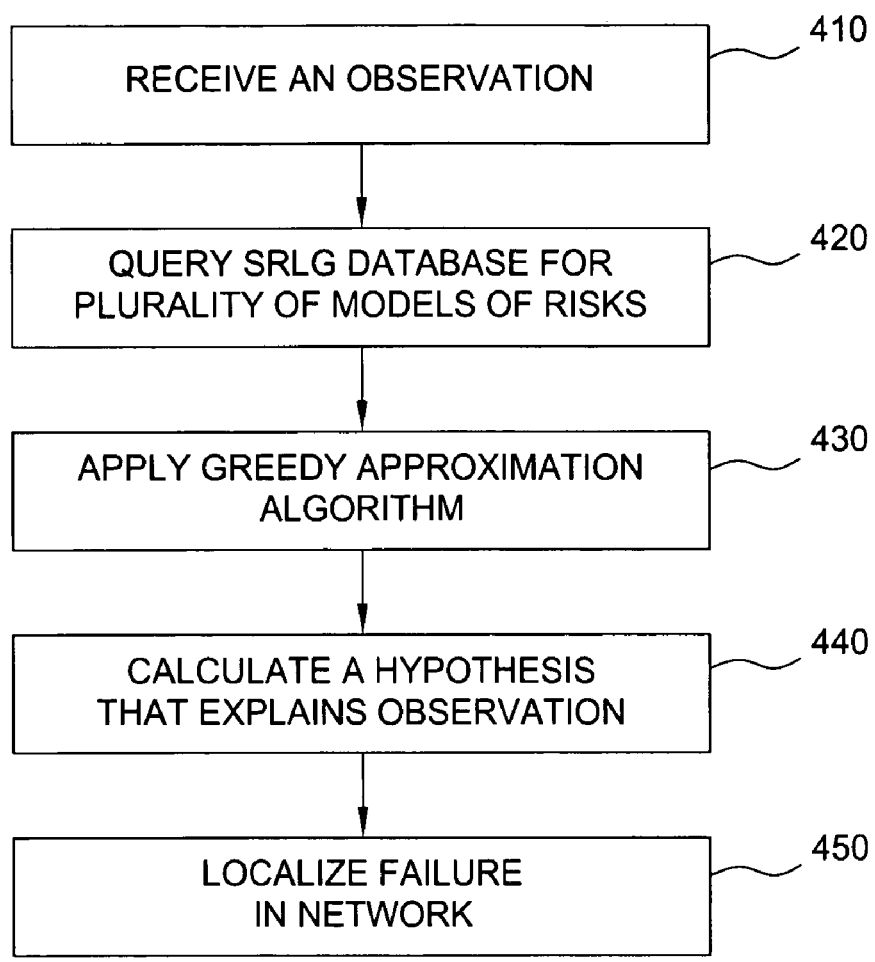
FIG. 4 illustrates a flowchart of a method for automatically localizing failures in a network in accordance with one or more aspects of the invention.

FIG. 4 illustrates a flowchart of a method 400 for automatically localizing failures in a network in accordance with one or more aspects of the invention. Method 400 starts in step 410, where SCORE Engine 302 receives an observation from FIP module 314. As described above, observations are a set of link failures that are potentially correlated, either temporally or otherwise. In step 420, SCORE Engine 302 queries SLRG database 320 for a plurality of models of risks.

In step 430, once SCORE Engine 302 has an observation and the plurality of models of risks, SCORE Engine 302 applies a greedy approximation algorithm. As discussed above, greedy approximation algorithm obtains the highest hit ratio and coverage ratio from the hit ratios and coverage ratios calculated during each iteration of the greedy approximation algorithm.

In step 440, SCORE Engine 302 calculates a hypothesis that explains the observation, using the greedy approximation algorithm. In step 450, the failure in the network is localized using the hypothesis calculated by SCORE Engine 302.

Figure 5:
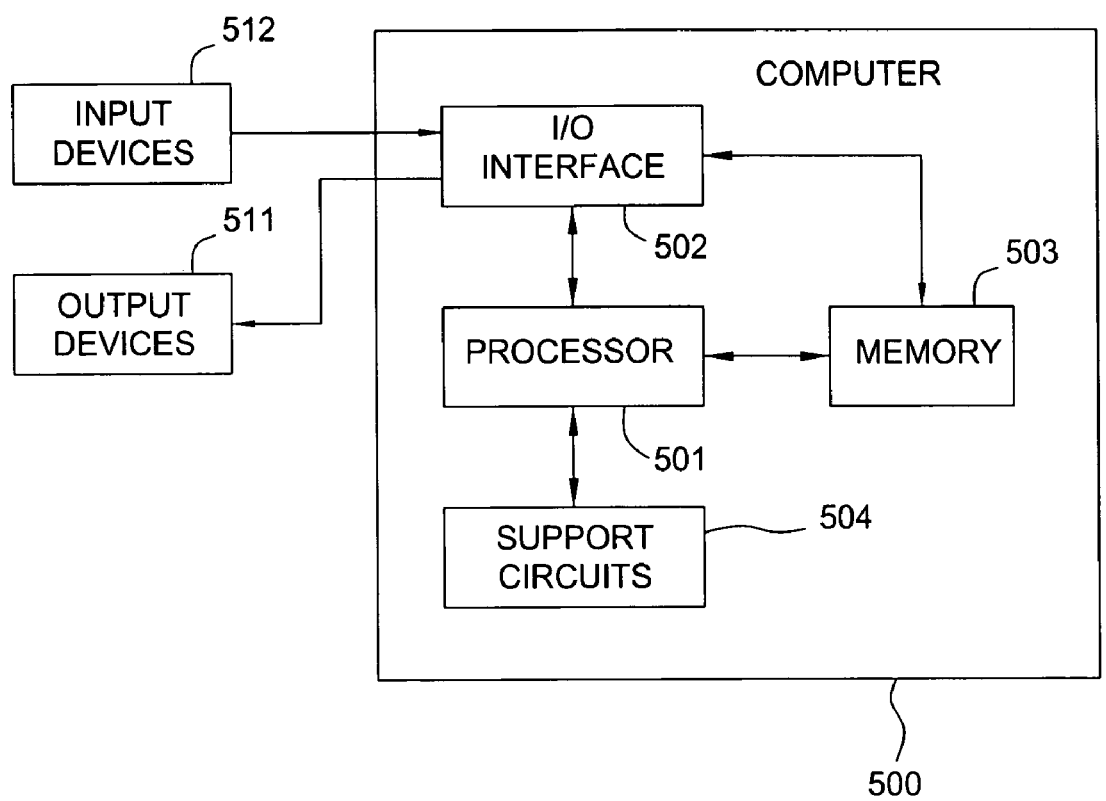
FIG. 5 is a block diagram depicting an exemplary embodiment of a computer for implementing the processes and methods described herein.

FIG. 5 is a block diagram depicting an exemplary embodiment of a computer 500 for implementing the processes and methods described herein. The computer 500 may be used to implement the SCORE platform 110. The computer 500 includes a processor 501, a memory 503, various support circuits 504, and an I/O interface 502. The processor 501 may be any type of microprocessor known in the art. The support circuits 504 for the processor 501 include conventional cache, power supplies, clock circuits, data registers, I/O interfaces, and the like. The I/O interface 502 may be directly coupled to the memory 503 or coupled through the processor 501. The I/O interface 502 may be coupled to various input devices 512 and output devices 511, such as a conventional keyboard, mouse, printer, and the like.

The memory 503 may store all or portions of one or more programs and/or data to implement the processes and methods described herein. Notably, the memory 503 may store program code to be executed by the processor 501 for implementing the SCORE platform 110. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method for automatically localizing failures in a network, comprising:

generating an observation from monitoring data associated with network elements in the network;

querying a database for a plurality of models of risks; and calculating a hypothesis from said plurality of models of risks that explains said observation, wherein said calculating step comprises applying a greedy approximation to said plurality of models of risks and said observation, wherein said greedy approximation further comprises maximizing a hit ratio and a coverage ratio;

wherein said hit ratio is defined as $|G_i \cap O|/|G_i|;$ wherein said coverage ratio is defined as $|G_i \cap O|/|O|;$ and wherein $|G_i|$ represents a total number of links that belong to a group $G_i$, $|O|$ represents an input observation and $|G_i \cap O|$ represents a number of elements of $G_i$ that also belong to O.

2. A computer-readable storage medium having stored thereon a plurality of instructions, the plurality of instructions including instructions which, when executed by a processor, cause the processor to perform the steps of a method for automatically localizing failures in a network, comprising:

generating an observation from monitoring data associated with network elements in the network;

querying a database for a plurality of models of risks; and calculating a hypothesis from said plurality of models of risks that explains said observation, wherein said calculating step comprises applying a greedy approximation to said plurality of models of risks and said observation, wherein said greedy approximation further comprises maximizing a hit ratio and a coverage ratio;

wherein said hit ratio is defined as $|G_i \cap O|/|G_i|;$ wherein said coverage ratio is defined as $|G_i \cap O|/|O|;$ and wherein $|G_i|$ represents a total number of links that belong to a group $G_i$, $|O|$ represents an input observation and $|G_i \cap O|$ represents a number of elements of $G_i$ that also belong to O.

3. Apparatus for automatically localizing failures in a network, comprising:

means for generating an observation from monitoring data associated with network elements in the network;

means for querying a database for a plurality of models of risks; and means for calculating a hypothesis from said plurality of models of risks that explains said observation, wherein said means for calculating applies a greedy approximation to said plurality of models of risks and said observation, wherein said greedy approximation further comprises maximizing a hit ratio and a coverage ratio;

wherein said hit ratio is defined as $|G_i \cap O|/|G_i|;$ wherein said coverage ratio is defined as $|G_i \cap O|/|O|;$ and wherein $|G_i|$ represents a total number of links that belong to a group $G_i$, $|O|$ represents an input observation and $|G_i \cap |/|O|$ represents a number of elements of $G_i$ that also belong to O.

\* \* \* \* \*